March 12, 1935.                A. J. FARMER                1,994,173
                               MEASURING VALVE
                              Filed June 15, 1925
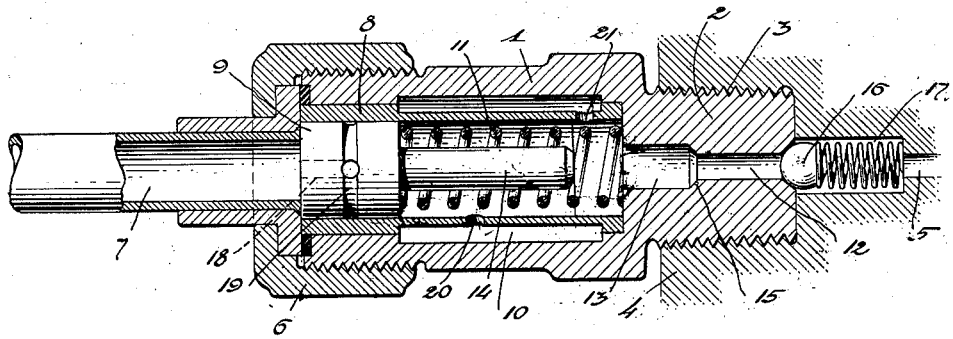
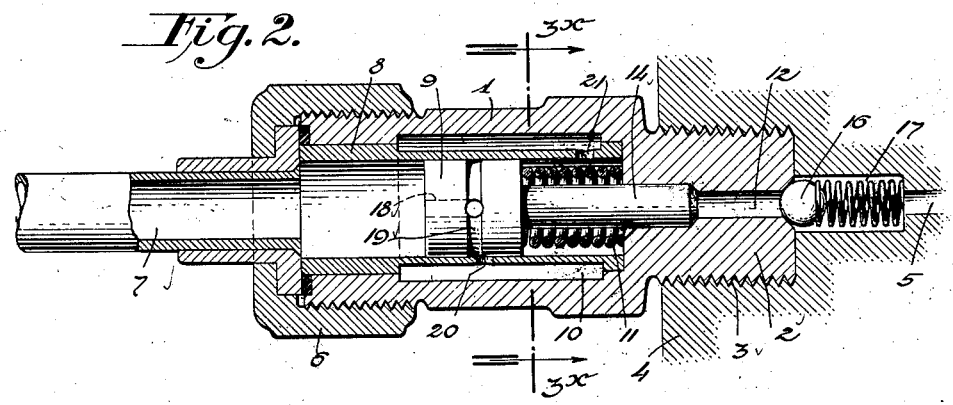
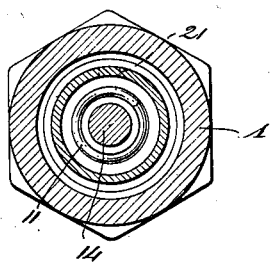
Inventor:
Albert J. Farmer
By
Attorneys.

Patented Mar. 12, 1935

1,994,173

UNITED STATES PATENT OFFICE 1,994,173

MEASURING VALVE

Albert J. Farmer, Detroit, Mich., assignor, by mesne assignments, to The Farval Corporation, Cleveland, Ohio, a corporation of Ohio Application June 15, 1925, Serial No. 37,093

6 Claims. (Cl. 184—7)

This invention relates to oil cups or valves through the medium of which oil, grease or other similar lubricant is admitted to a bearing or device requiring a periodic supply of lubricant.

Efficiency in lubricating is dependent upon adequate supply of lubricant at proper intervals, and where automatic lubrication is not provided, as for instance in many parts of machines and especially those parts which are usually equipped with grease cups for the supply of heavier oils and greases, it frequently occurs that bad judgment on the part of an operator results in either the supply of an insufficient amount of lubricant at one time or the wasting of the lubricant by effecting an over-supply thereof. Similar conditions are also met with in forced feed systems of lubrication, wherein, due to the fact that lubrication of a number of parts is effected from a common source and the amount of lubricant required for different parts may vary considerably, either too much lubricant is supplied to those parts requiring little, or not sufficient to those requiring greater amounts.

This invention therefore has for its object to provide for the definite measuring of the amount of lubricant supplied to any particular bearing or part, so that a full charge of lubricant may be so supplied, and no more, upon each operation of the main lubricant supplying or distributing means.

A further object of the invention is to provide a valvular device attachable to the lubricant inlet or oil duct of a bearing or part through which lubricant may be passed to said bearing or part, and by means of which the amount of lubricant so passed at any one supplying operation will be both measured and limited.

The invention further contemplates the provision of a device for attachment to an oil or grease duct, said device including a lubricant measuring chamber and means controlling the filling of said chamber with lubricant and the ejection of lubricant from said chamber into said duct.

Still further objects subsidiary to or resulting from the aforesaid objects, or from the construction or operation of the invention as it may be carried into effect, will become apparent as the said invention is hereinafter further disclosed.

In carrying the said invention into effect, I may provide a valvular device, the outlet end of which is applicable to an oil or grease duct of a machine or apparatus and the inlet end of which may be connected to a suitable means of lubricant supply, said device comprising a hollow casing within which is a tubular cylinder surrounded by a chamber and housing a reciprocable piston adapted to reciprocate against the action of a spring by lubricant introduced under pressure through the inlet of the device, said piston being ported so that when it is moved forward by the pressure of the lubricant supply, communication is established between the cylinder and the opposite sides of the piston and said chamber, whereby lubricant flows through said chamber to the cylinder in advance of the piston. The piston is also provided with a valve member which prevents flow of lubricant through the outlet of the device while communication is established between opposite sides of the piston through said chamber, said valve member being unseated during a portion of the succeeding rearward movement of the piston after which the lubricant which has been transferred in advance of the piston is then forced through the outlet of the device in measured quantity.

All of which is more particularly described and ascertained hereinafter, by way of example, having reference to the accompanying drawing, wherein:—

Fig. 1 is a longitudinal section of a measuring valve embodying said invention, and shown as applied to the oil duct of a device;

Fig. 2 is a view similar to Fig. 1, illustrating the movable parts in a different position, and Fig. 3 is a section on the line 3x—3x of Fig. 2.

Similar reference characters indicate similar parts in the several figures of the drawing.

A hollow casing 1 is shown as having a threaded extension 2 at its forward end, whereby it may be inserted in the tapped hole 3 of a device 4 in communication with a lubricant duct 5 in the said device, 6 being a cap threaded on to the outer end of the casing 1 by means of which an oil or lubricant pipe 7 is secured to the said end of the casing. The duct 5 of course will lead to a bearing or part to be lubricated (not shown).

Within the casing is a tubular liner 8 which forms the cylinder within which a piston 9 reciprocates, the wall of said casing being internally recessed to form an annular chamber 10 around the said cylinder. 11 is a spring housed in said cylinder and tends to retain the piston 9 in the position indicated in Fig. 1, the spring thus supporting the piston operatively in opposition to the pressure of the lubricant in the supply line.

The piston 9 obviously must reciprocate smoothly and without frictional drag as there must be a minimum of resistance against the spring pressure. Smooth reciprocating action is obtained by holding the piston diameter to about two thousandths of an inch less than the diameter of cylinder or sleeve 8.

The forward end of the casing is provided with an outlet passage 12, the inner end of which is enlarged as at 13, to receive a stem or valve member 14 which extends forwardly from the piston 9, when the piston is moved forwardly in a manner to be further described, the shoulder 15 provided between the larger and smaller portions of the outlet passage serves to limit the forward movement of the valve member 14 and incidentally of the piston 9. Since the member 14 slidably fits the bore of portion 13 of the outlet, and is movable into and out of such bore, member 14 may be considered as a valve active in the control of the outlet, with shoulder 15 acting as the seat of the valve.

The outer end of the outlet passage 12 is preferably closed by a check valve, such as a spring-pressed ball 16, housed in a recess 17 forming an entrance to the oil duct 5. The piston 9 is provided with a passage 18 extending inwardly of the head thereon and communicating with an annular channel 19 in the peripheral face of the piston, and the cylinder 8 is provided with ports 20 and 21, the purpose of which will now be explained.

When the described device is applied to the lubricant duct of a machine or other device, it is intended as a general rule that it shall be considered as a fixture remaining in position at all times to facilitate the ready introduction of a predetermined amount or increment of lubricant to such duct according to requirements.

Assuming the device to be in the position shown in Fig. 1 and the spring chamber ahead of piston 9, and chamber 10 full of lubricant, lubricant under pressure acting on head 9 will cause the same to move toward the outlet 12, discharging the lubricant forward of piston 9 out past check valve 16 until extension 14 enters bore 13. Air can readily be exhausted from the device by reason of the fact that the sliding fit of the piston extension is not air-tight so that when the device is ready for operation the spring chamber and chamber 10, as well as the bores 13 and 12, will be filled with lubricant. When the extension 14 of the piston enters the bore 13 further movement is possible because of the clearance between such extension and bore 13. This clearance is sufficient to allow seepage of lubricant when necessary. After the extension 14 enters bore 13 continued pressure on piston 9 will cause a small amount of lubricant to seep past extension 14 and through the outlet until extension 14 seats at the bottom of bore 13 such seating obviously preventing further seepage. The operation then on the forward stroke is such that a certain predetermined amount of lubricant is discharged during the movement of the piston from the position shown in Fig. 1 to the position shown in Fig. 2. It should be stated that as the extension 14 enters the bore 13 lubricant will seep forwardly around and past the extension so that it is not necessary to compress the lubricant in the spring chamber. When the piston 9 is in the position shown in Fig. 2 lubricant enters passage 18 in such piston and it then flows outwardly to the peripheral groove 19, after which it passes through ports 20 into the chamber 10. Lubricant continues to flow, now passing through ports 21 into the spring chamber until the pressure on both sides of piston 9 is equalized. The pressure in the line is then relieved and the spring 11 forces the piston 9 back to its position shown in Fig. 1. As the piston moves rearwardly lubricant will flow through passage 18, peripheral groove 19, through ports 20, chamber 10, ports 21 and into the spring chamber. This flow will continue until peripheral groove 19 passes out of direct register with ports 20. Thereafter lubricant from the left hand side of piston 9 will flow through passage 18, groove 19 and thence past the right hand portion of piston 9, through ports 20 and thus to chamber 10. After the right hand portion of piston 9 in its leftward movement has completely passed ports 20, lubricant will flow from the chamber at the left of piston 9 through passage 18, groove 19 and thence past the right portion of piston 9 directly to the spring chamber. This transfer of lubricant continues until piston 9 reaches its extreme left position, as shown in Fig. 1. At the same time the return movement of the piston 9 creates a vacuum in the spring chamber, which is slowly dissipated as the lubricant is transferred in the manner last described. Furthermore, on the return stroke lubricant seeps past the extension 14 to the outlet inasmuch as the spring chamber is of less volume than the chamber immediately to the left of the piston 9 because the extension 14 occupies part of the space in the spring chamber.

It will be apparent that the measured amount of lubricant discharged with each forward movement to the right of piston 9 will be that amount of lubricant which is transferred from the left hand side of piston 9 to the spring chamber on the return movement to the left by piston 9.

It will also be seen that when the inlet passages 18, 19, and ports 20 and 21 are open to the spring chamber, the outlet 12 is substantially closed by valve 14. Further, when outlet 12 is fully open the inlet passages are substantially closed. This is essential to prevent free flow of lubricant through the device at any position and insures the positive delivery of the measured charge from each valve to its lubricant duct regardless of any variation in the resistance offered by the duct or the part to be lubricated.

It should also be noted that the check valve 16 serves the dual function of preventing the withdrawal of lubricant from the duct 5 upon the movement of piston 9 to the left and also makes possible the creation of a vacuum in the spring chamber as piston 9 moves to the left.

Other modes of applying the principle of our invention may be employed instead of the one explained, change being made as regards the mechanism herein disclosed, provide the means stated by any of the following claims or the equivalent of such stated means be employed.

I therefore particularly point out and distinctly claim as my invention:—

1. As a new article of manufacture, a lubricating device comprising a casing, having a lubricant inlet and a lubricant outlet, with means between said inlet and outlet for ejecting a predetermined amount of lubricant through said outlet, said means including a piston chamber and a piston that reciprocates to open and close said outlet, said piston seating against said outlet at the end of its forward stroke, said means further including means permitting free flow between said inlet and said chamber when said piston is seated against said outlet and preventing free flow between said inlet and said chamber when said piston is not seated against said outlet.

2. As a new article of manufacture, a lubricating device comprising a casing, having a lubricant inlet and a lubricant outlet, with means between said inlet and outlet for ejecting a predetermined amount of lubricant through said outlet, said means including a piston chamber and a piston that reciprocates to open and close said outlet, said piston seating against said outlet at the end of its forward stroke, said means further including means permitting free flow between said inlet and said chamber when said piston is seated against said outlet and preventing free flow between said inlet and said chamber when said piston is not seated against said outlet, the bore of said outlet being enlarged to slidably receive a portion of said piston, and a shoulder against which the end of said piston seats.

3. As a new article of manufacture, a lubricating device comprising a casing, having a lubricant inlet and a lubricant outlet, with means between said inlet and outlet for ejecting a predetermined amount of lubricant through said outlet, said means including a piston chamber, a by-pass chamber surrounding said piston chamber and a piston having an extension thereon that reciprocates to open and close said outlet, said piston having a circumferential groove and an interior passage leading from the inlet side of said casing to said groove, said groove registering with ports in said by-pass chamber when said extension has closed said outlet.

4. As a new article of manufacture, a lubricating device comprising a casing, having a lubricant inlet and a lubricant outlet, with means between said inlet and outlet for ejecting a predetermined amount of lubricant through said outlet, said means including a piston chamber, a by-pass chamber surrounding said piston chamber and a piston having an extension thereon that reciprocates to open and close said outlet, said piston having a circumferential groove and an interior passage leading from the inlet side of said casing to said groove, said groove registering with ports in said by-pass chamber when said extension has closed said outlet, said by-pass chamber having other ports communicating with said piston chamber, all of said means permitting transfer of a measured quantity of lubricant from the inlet side of said piston to the outlet side of said piston.

5. As a new article of manufacture, a lubricating device comprising a casing, having a lubricant inlet and a lubricant outlet, a delivery duct connected to said outlet, with means between said inlet and outlet for ejecting a predetermined amount of lubricant through said outlet, said means further including means permitting free flow between said inlet and the interior of said casing when said outlet is closed, and preventing free flow between said inlet and the interior of said casing when said outlet is open, and check valve means in said delivery duct preventing lubricant flow in a direction from said duct to said outlet.

6. As a new article of manufacture, a lubricating device comprising a casing, having a lubricant inlet and a lubricant outlet, with means between said inlet and outlet for ejecting a predetermined amount of lubricant through said outlet, said means including a piston chamber and a piston that reciprocates to open and close said outlet, said piston seating against said outlet at the end of its forward stroke, said means further including means permitting free flow between said inlet and said chamber when said piston is seated against said outlet and preventing free flow between said inlet and said chamber when said piston is not seated against said outlet, and check valve means in said outlet preventing lubricant flow back into said chamber.

ALBERT J. FARMER.